(12) United States Patent
Rhee et al.

(10) Patent No.: US 8,094,589 B2
(45) Date of Patent: Jan. 10, 2012

(54) METHOD AND APPARATUS FOR MULTIMEDIA MESSAGING SERVICE USING PARLAY X WEB SERVICE

(75) Inventors: Eun Jun Rhee, Daejeon (KR); Won Ryu, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1435 days.

(21) Appl. No.: 11/634,789

(22) Filed: Dec. 5, 2006

(65) Prior Publication Data

US 2007/0133761 A1 Jun. 14, 2007

(30) Foreign Application Priority Data

Dec. 8, 2005 (KR) .................. 10-2005-0119326
Jun. 7, 2006 (KR) .................. 10-2006-0051111

(51) Int. Cl.
*H04B 1/44* (2006.01)
(52) U.S. Cl. ........................ 370/282; 709/207
(58) Field of Classification Search .......... 370/282; 709/207
See application file for complete search history.

(56) References Cited

U.S. PATENT DOCUMENTS

| | | | |
|---|---|---|---|
| 2006/0030297 A1* | 2/2006 | Coble et al. | 455/412.1 |
| 2006/0104306 A1* | 5/2006 | Adamczyk et al. | 370/466 |
| 2006/0155814 A1* | 7/2006 | Bennett et al. | 709/207 |
| 2006/0165082 A1* | 7/2006 | Pfeffer et al. | 370/392 |

FOREIGN PATENT DOCUMENTS

| | | |
|---|---|---|
| KR | 10-0241351 | 11/1999 |
| KR | 10-0266864 | 6/2000 |
| KR | 1020030058653 A | 7/2003 |
| KR | 100519194 B1 | 9/2005 |

* cited by examiner

*Primary Examiner* — Man Phan
*Assistant Examiner* — Wei Zhao
(74) *Attorney, Agent, or Firm* — Blakely, Sokoloff, Taylor & Zafman

(57) ABSTRACT

Provided is a method and apparatus for providing a multimedia message service based on a Parlay X Web service to easily check the status of a multimedia message which is requested to be transmitted in a multimedia messaging application server. The apparatus activates a delivery status informing function for each application server upon receipt of a delivery status information activation request, receives a process result for the multimedia message requested by the application server from an MMS server, and transmits the delivery status information for the requested multimedia message to the application server, for which the status informing function is activated, through a status informing message in real-time.

6 Claims, 5 Drawing Sheets

METHOD AND APPARATUS FOR MULTIMEDIA MESSAGING SERVICE USING PARLAY X WEB SERVICE

RELATED APPLICATION

The present application is based on, and claims priority from, Korean Application Number 2005-119326, filed Dec. 8, 2005, and Korean Application Number 2006-51111, filed Jun. 7, 2006, the disclosure of which is hereby incorporated by reference herein in its entirety.

BACKGROUND OF THE INVENTION

1. Field of the Invention

The present invention relates to a method and apparatus for providing a multimedia message service using a Parlay X Web service, which enables a multimedia messaging application server to easily check the status of a multimedia message which is requested to be transmitted.

2. Description of the Related Art

The Parlay X Web service technology provides a standardized interface between an application service layer and a transmission layer of a communication network in order to enable a third party to provide services to users not by being bound to a specific communication network but by using the capability of the communication network, such as wired/wireless call control function, short message service (SMS) and multimedia message service (MMS) transmission/reception function, and positioning of a particular subscriber.

FIG. 1 shows a structure of an open-type service platform based on Parlay X Web service. The open-type service platform includes a Parlay gateway 20 which functions as a sort of middleware between an application server 10 and a wired/wireless communication network 30. The application server 10 provides a predetermined service to users by using the capability of a communication network, and the wired/wireless communication network 30 has its own communication network capability and resources. With the Parlay X gateway 20, the application server 10 is not bound to a specific communication network and provides the service by using the resources of the wired/wireless communication network 30.

The Parlay X gateway 20 has its Service Capable Feature (SCF) in connection with corresponding network resources according to the level of communication network capability and has Application Programming Interface (API) function set up according to the provided service. When the application server 10 calls for an API function, the API function operates and cooperates with network resources of the communication network 30. The SCF includes a short message service (SMS) SCF, a multimedia message service (MMS) SCF, a telephone call connection (TPC) SCF, and a presence SCF for processing status information of a particular user.

The open-type service platform is suggested by a Parlay group and made public as specifications of the 3GPP, ETSI and 3GPP2 by the 3$^{rd}$ Generation Project Partnership (3GPP), which is a substantial standard group for the third mobile communication, through a Joint Working Group (JWG) activity.

Recently, the 3GPP and the Parlay Group are standardizing Parlay X MM API related to a multimedia message service for transmitting/receiving a multimedia message to/from a mobile terminal. The multimedia message is a message combined with music, moving picture, image and/or text. At present, the 3GPP Transport Stream (TS) 29. 119-5 v6.3.0 is suggested as a standard document.

According to the standard document, a Parlay X MM API defined in the standard document can be called remotely between the application server using a multimedia message service and the Parlay X gateway through a Simple Object Access Protocol (SOAP) message.

FIG. 2 shows a signal flow in the multimedia message transmission procedure based on the 3GPP TS29. 119-5 v6.0.0.

Referring to FIG. 2, at step S101, the application server 10 includes a multimedia message to be transmitted into a multimedia message send message request, i.e., SendMessage Request, and transmits the multimedia message SendMessage Request including the multimedia message to the Parlay X gateway 20 to transmit the multimedia message through a communication network.

At step S102, the Parlay X gateway 20 receives the multimedia message SendMessage Request and generates a string-type MM reference identification value for identifying the multimedia message, i.e., ReferenceID. At step S103, puts the MM ReferenceID into a response message, i.e., SendMessage Response, and transmits the SendMessage Response to the application server 10 to thereby notice that the Parlay X gateway 20 has received the multimedia message SendMessage Request.

The application server 10 uses the MM ReferenceID to perform a subsequent process for the multimedia message such as checking the delivery status and canceling transmission.

At step S104, the Parlay X gateway 20 requests to transmit the multimedia message to a user terminal 40 by transmitting the multimedia message requested to be transmitted through an MM7_Submit_REQ message of an MM7 Protocol, which is a protocol defined in a multimedia message service (MMS) server 31 which provides a multimedia message service in the communication network 30.

At step S105, the Parlay X gateway 20 sets up a DeliveryStatus value at a waiting mode, i.e., MessageWaiting. The DeliveryStatus value indicates the delivery status of the multimedia message until the MM7_Submit_RES message from the MMS server 31.

Herein, the MMS server 31 which has received the MM7_Submit_REQ message extracts a multimedia message to be transmitted and a destination thereof by analyzing the MM7_Submit_REQ message, transmits the multimedia message to the user terminal 40, puts a multimedia message delivery result in the MM7_Submit_RES message, and transmits the MM7_Submit_RES message with the a multimedia message delivery result to the Parlay X gateway 20, at step S108.

At step S109, the Parlay X gateway 20 sets up a DeliveryStatus value at 'Delivered,' when the status value included in the received MM7_Submit_RES message indicates 'transmission succeeded'; or it sets up a DeliveryStatus value at 'DeliveryImpossible,' when the status value included in the received MM7_Submit_RES message indicates 'transmission failed.'

In the above-described transmission of a multimedia message, the application server 10 using the multimedia message transmission transmits a message requesting for the delivery status, i.e., GetMessageDeliveryStatus Request message, to the Parlay X gateway 20 at every moment when delivery status information is needed in order to acquire delivery status information of a multimedia message at steps 106 and 110. Herein, the GetMessageDeliveryStatus Request message uses an MM ReferenceID included in a SendMessage Response with respect to a transmission request received before as its parameter at steps 106 and 110.

At steps 107 and 110, the Parlay X gateway 20 puts a DeliveryStatus value corresponding to the MM Reference ID, that is, one among 'MessageWaiting,' 'Delivered' and 'DeliveryImpossible,' into the GetMessageDeliveryStatus Response and transmits the GetMessageDeliveryStatus Response to the MM application server 10. 'MessageWaiting' is transmitted as the DeliveryStatus vale until the Parlay X gateway 20 receives the MM7_Submit_RES message from the MMS server 31. After the Parlay X gateway 20 receives the MM7_Submit_RES message from the MMS server 31, 'Delivered' or 'DeliveryImpossible' is transmitted according to a delivery result included in the MM7_Submit_RES message.

The application server 10 can check out the delivery status of a multimedia message it has requested from the DeliveryStatus value included in the received GetMessageDeliveryStatus Response.

According to the conventional technology, the application server 10 should inquire the Parlay X gateway 20 for the delivery status of a message repeatedly to know whether a multimedia message requested to be transmitted is transmitted successfully or not, until it acquires 'Delivered' or 'DeliveryImpossible.'

Therefore, if the transmission of MM7_Submit_REQ message or MM7_Submit_RES message is delayed between the Parlay X gateway 20 and the MMS server 31 or if transmission process of a corresponding multimedia message is delayed in the Parlay X gateway 20 or the MMS server 31 due to a great deal of messages or overload, the application server 10 transmits many GetMessageDeliveryStatus Request messages to the Parlay X gateway 20 and the Pariay X gateway 20 transmits many GetMessageDeliveryStatus Response messages. This causes wasteful use of resources and loads on both application server 10 and the Parlay X gateway 20 unnecessarily.

SUMMARY OF THE INVENTION

Accordingly, the present invention is directed to a method and apparatus for a multimedia message service based on Parlay X Web service that substantially obviates one or more problems due to limitations and disadvantages of the related art.

An object of the present invention is to provide a method and apparatus for providing a multimedia message service using a Parlay X Web service, which enables a multimedia messaging application server to easily check the status of a multimedia message which is requested to be transmitted.

Another object of the present invention is to provide a method and apparatus for providing a multimedia message service based on Parlay X Web service, which enables the application server to efficiently check the status of a multimedia message, while not causing wasteful use of resources or loads between an application server and a Parlay X gateway.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an aspect of the present invention, there is provided a method for providing a multimedia message based on Parlay X Web service, the method including the steps of: receiving a multimedia message transmission request, i.e., a SendMessage Request, from an application server; analyzing the multimedia SendMessage Request, extracting a multimedia message that is requested, and generating an identification value for the multimedia message; transmitting a response message to the multimedia SendMessage Request which includes the multimedia message identification value to the application server; putting the extracted multimedia message in a message based on a protocol of a communication network, and transmitting the message based on the protocol of the communication network to a multimedia message service (MMS) server; receiving a process result from the MMS server; generating a status informing message for informing a delivery status of the multimedia message by combining the received process result with the multimedia message identification value, and transmitting the generated status informing message to the application server; and receiving a response message to the status informing message from the application server.

The method further includes the steps of: receiving a status informing activation request message for requesting to activate a status informing function for a transmitted multimedia message from the application server; and analyzing the received status informing activation request message, and activating a delivery status informing function for multimedia messages of the application server, wherein the status informing message is generated and transmitted only for multimedia messages of the application server of which the delivery status informing function is activated.

The method further includes the steps of: receiving a status informing inactivation request message for requesting to inactivate a status informing function for a transmitted multimedia message from the application server; and analyzing the received status informing inactivation request message, and inactivating a delivery status informing function for multimedia messages of the application server, wherein the status informing message is not generated for multimedia messages of the application server of which the delivery status informing function is inactivated.

According to another aspect of the present invention, there is provided an apparatus for providing a multimedia message service, the apparatus including: an open-type application programming interface (API) processor for receiving a request for a multimedia message, i.e., SendMessage Request, and a delivery status informing activation/inactivation request from an application server by calling an API function of the application server, and transmitting a process result to the application server; a multimedia message (MM) 7 protocol processor for transmitting the multimedia SendMessage Request of the application server to an MM server of a communication network by exchanging messages with the MM server providing a multimedia message service based on a protocol of the MM server, and receiving a process result from the MM server; a multimedia service controller for a multimedia service controller for analyzing a message transmitted from the open-type API processor, setting up a delivery informing function for multimedia messages of the application server at activation/inactivation if the message is a delivery status informing activation/inactivation request message, transmitting the multimedia message to the MM7 protocol processor for transmission if the message is a multimedia SendMessage Request, receiving a process result for the multimedia message from the MM7 protocol processor, checking whether a corresponding delivery status informing function is activated, and transmitting the delivery status informing message to the application server through the open-type API processor when the delivery status informing function is activated; and a storage for storing activation/inactivation information of a delivery status informing function of each application server, which is processed by the multimedia service controller, and variables and identifications requested to process the multimedia message.

The status informing message includes an MM identification value, i.e., ReferenceID, which is generated by receiving the multimedia SendMessage Request from the application server, and delivery information for informing a delivery status of the multimedia message corresponding to the ReferenceID, i.e., DeliveryInfomation, as parameters.

The DeliveryInfomation is composed of a list of destination addresses included in the multimedia SendMessage Request transmitted from the application server and delivery status values each of which corresponding to each of the destination addresses.

The delivery status values includes status values indicating that corresponding multimedia messages are transmitted to users successfully, and status values indicating that transmission of corresponding multimedia messages to users is failed.

The status informing activation request message and the status informing inactivation request message includes an application server identification value, i.e., AsRegistrationID, given to each application server, individually.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
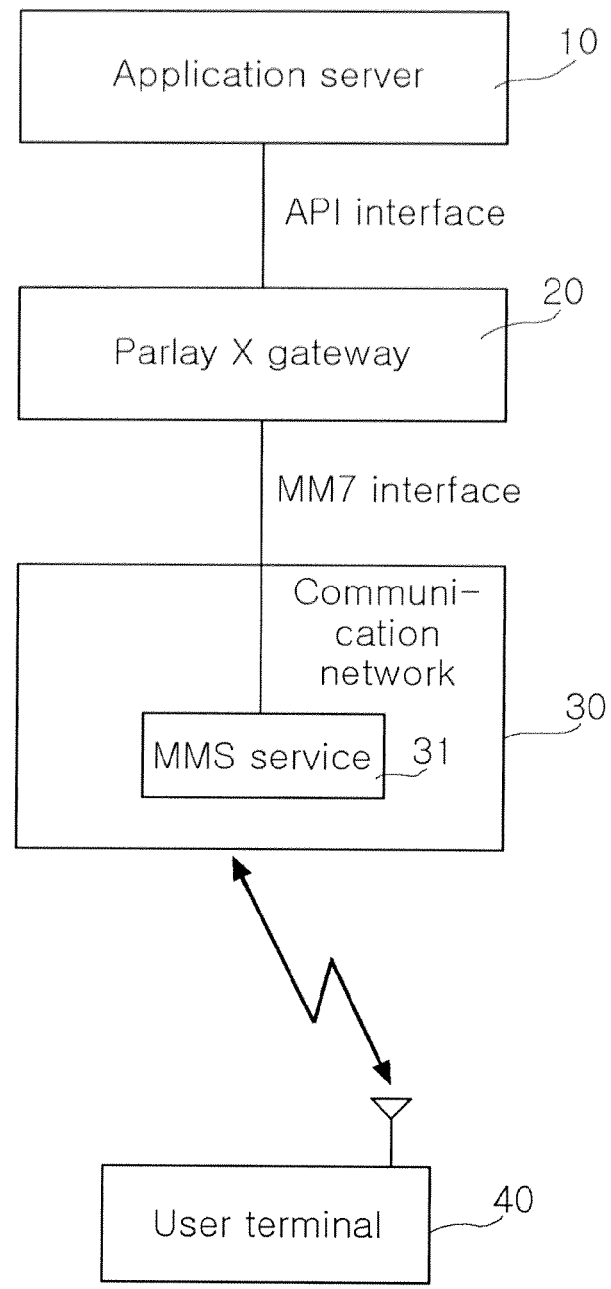
FIG. 1 is a block diagram showing a multimedia message service providing system based on Parlay X Web service.
Figure 2:
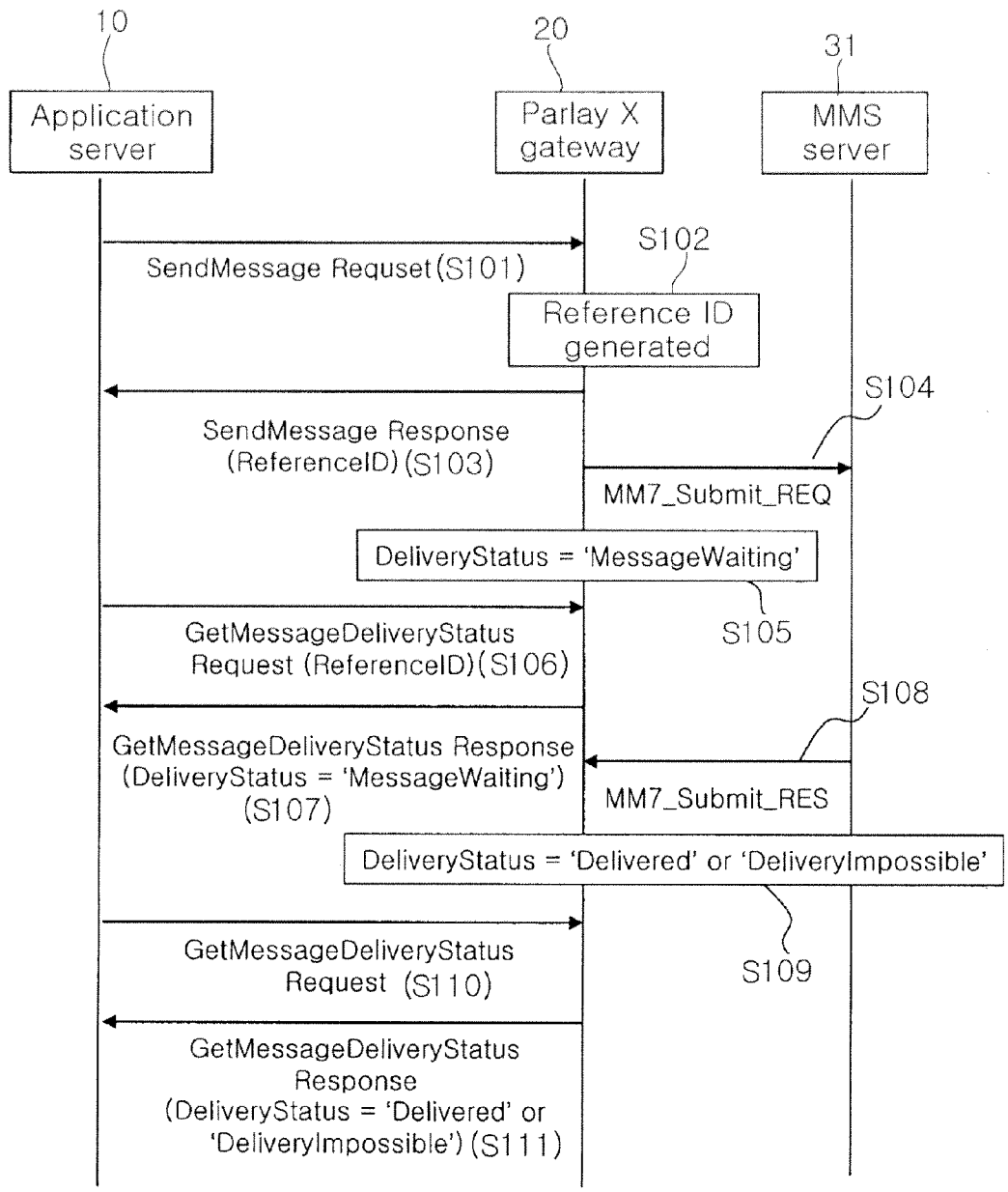
FIG. 2 is a flowchart describing a multimedia message transmission procedure based on Standard Application Programming Interface (API) defined in the 3GPP TS29.1195 version 6.0.0 document.

Reference will now be made in detail to the preferred embodiments of the present invention, examples of which are illustrated in the accompanying drawings. The same reference numerals are given to the same constituent element. Also, when it is considered that detailed description on a related art or a structure may obscure the point of the present invention unnecessarily, the description will not be provided herein.

According to the present invention, in the open-type service platform suggested shown in FIG. 1, messages exchanged between an application server 10 and a Parlay X gateway 20 to check the status of a multimedia message are as follows.

1) Status Informing Message

A status informing message is a message that transmits information on the status of a predetermined multimedia message from the Parlay X gateway 20 to the application server 10. The status informing message includes a string-type multimedia message (MM) ReferenceID and a delivery information value, i.e., DeliveryInformation, as its parameters. The MM ReferenceID is a value generated to identify each multimedia message requested by the application server 10 in the Parlay X gateway 20. The MM ReferenceID is the same value as a SendMessage Response defined in the 3GPP TS29.119-5 v6.0.0 document. The DeliveryInformation informs whether a multimedia message is transmitted successfully, failed to be transmitted, or in the middle of transmission. The DeliveryInformation is the same value as a DeliveryInformation type defined in the 3GPP TS29.119-5 v6.0.0 document. In short, information that forms the DeliveryInformation includes a list of destination addresses included in the SendMessage Request and delivery status values each corresponding to each of the destination addresses.

The Parlay X gateway 20 may transmit the status informing message to the application server 10 instantly when the multimedia delivery status is changed. Specifically, it transmits corresponding delivery status information to the application server 10 at a moment when it receives a response on the transmission of a multimedia message from an MM server 31.

The above-described method makes the application server 10 acquire status information on the transmitted multimedia message without any inquiring process.

2) Status Informing Activation Request Message and Status Informing Inactivation Request Message A status informing activation request message and a status informing inactivation request message are messages for selecting whether to receive the status informing message from the Parlay X gateway 20 in the application server 10 according to conditions and policy. The status informing activation request message and a status informing inactivation request message request the Parlay X gateway 20 to activate and inactivate the transmission of the status informing message, respectively.

The status informing activation request message and a status informing inactivation request message include a string-type application server identification value, i.e., AsRegistrationID, for identifying an application server 10 as a parameter. The AsRegistrationID is a value given in off-line when the application server 10 is registered in the Parlay X gateway 20, and it is used to identify application servers one from another.

Each application server 10 can activate or inactivate 10 its request for information on the status of a message to the Parlay X gateway 20 with the status informing activation request message and a status informing inactivation request message.

Figure 3:
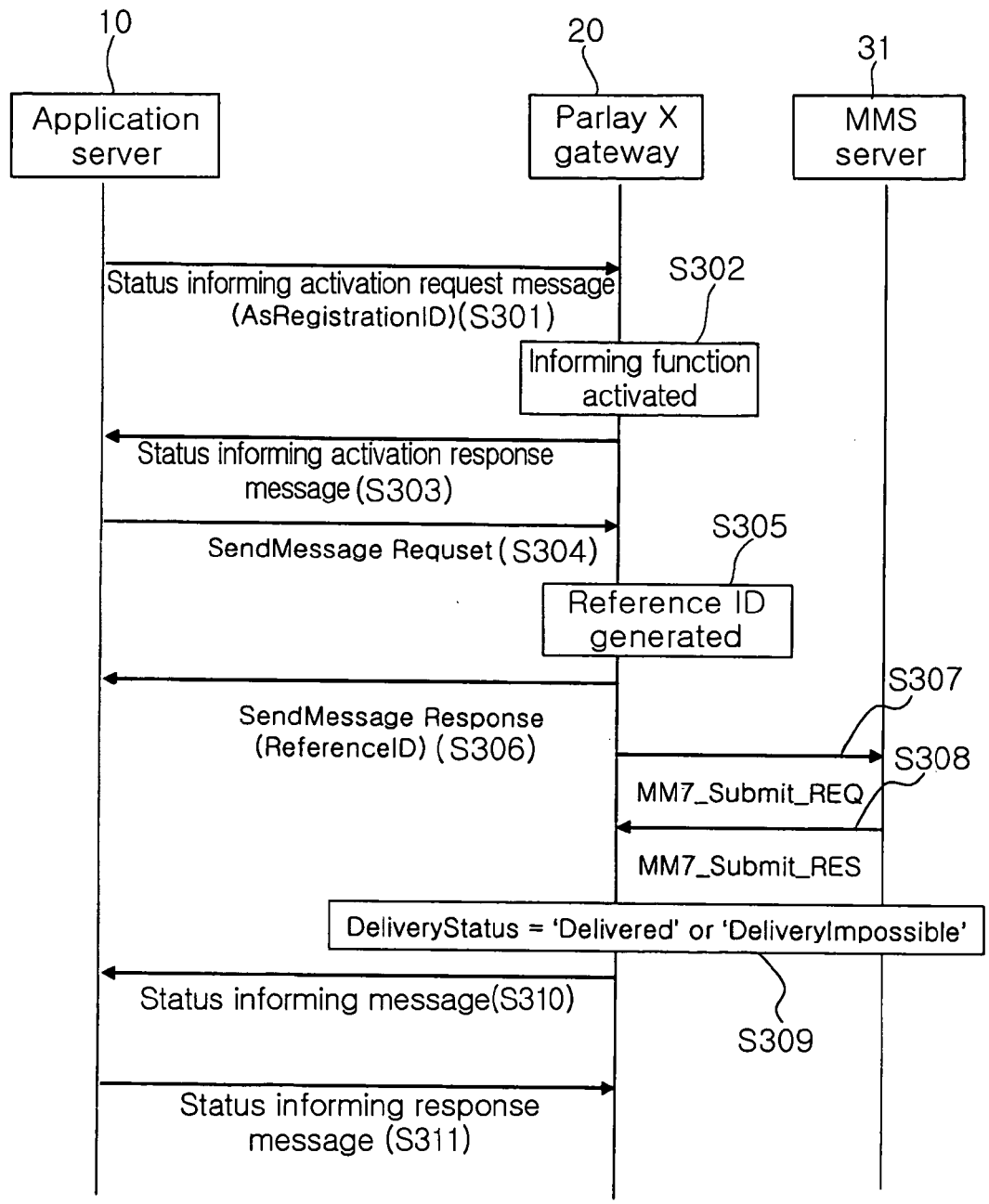
FIG. 3 shows a signal flow in a, multimedia message service providing procedure based on the Parlay X Web service in accordance with an embodiment of the present invention.

FIG. 3 shows a signal flow in a multimedia message service providing procedure based on the Parlay X Web service in accordance with an embodiment of the present invention.

To receive the status informing message from the Parlay X gateway 20 by using the message suggested in the present invention, the application server 10 should transmit a status informing activation request message to the Parlay X gateway 20 at step S301 to thereby activate a delivery status informing function of the Parlay X gateway 20 for the application server 10. At step S302, the Parlay X gateway 20 receives the status informing activation request message, identifies the application server 10 that has requested for the status informing activation by using an AsRegistrationID included in the received status informing activation request message, and activates the delivery status informing function for the application server 10.

The Parlay X gateway 20 transmits a status informing activation response message to the application server 10 to inform that the status informing function is activated as requested.

At step S304, the application server 10 transmits a message requesting transmission of a multimedia message, i.e., Send-Message Request, including a multimedia message to be transmitted to the Parlay X gateway 20, whenever there is a multimedia message to be transmitted to the Parlay X gateway 20. At step S305, the Parlay X gateway 20 generates and sets up a string-type MM identification value, i.e., MM ReferenceID, for each multimedia message included in the SendMessage Request. At step S306, the Parlay X gateway 20 puts the generated MM ReferenceID into a multimedia message transmission response message, i.e., SendMessage Response, and transmits the SendMessage Response to the application server 10 to inform that the Parlay X gateway 20 has received the SendMessage Request.

The application server 10 uses the MM ReferenceID to perform a subsequent process for the multimedia message, such as checking a delivery status and canceling a transmission request.

The Parlay X gateway 20 transmits the multimedia message requested to be transmitted through an MM7_Submit_REQ message of an MM7 Protocol, that is a transmission message of a protocol defined in a multimedia message service (MMS) server 31 and requests the MMS server 31 to transmit the multimedia message to a user terminal 40.

The MMS server 31 processes the received MM7_Submit_REQ message, puts the process result into an MM7_Submit_RES message and transmits the MM7_Submit_RES message to the Parlay X gateway 20.

The Parlay X gateway 20 sets up a DeliveryStatus value indicating the delivery status of the multimedia message at a waiting mode, i.e., MessageWaiting, until it receives the MM7_Submit_RES message from the MMS server 31. When the Parlay X gateway 20 receives the MM7_Submit_RES message from the MMS server 31, it sets up the DeliveryStatus value at 'Delivered' or 'DeliveryImpossible.'

The Parlay X gateway 20 transmits the multimedia message by using a message defined in the 3GPP TS29, which is described above. When the Parlay X gateway 20 figures out the delivery status of the multimedia message requested by the application server 10 for which the informing function of the Parlay X gateway 20 is activated, that is, when the DeliveryStatus value is set at 'Delivered' or 'DeliveryImpossible,' or when the Parlay X gateway 20 receives the delivery result, i.e., the MM7_Submit_RES message, from the MMS server 31, the delivery information, which is 'Delivered' or 'DeliveryImpossible,' is put into a status informing message, and transmitted to the application server 10.

The status informing message includes DeliveryInformation and an MM ReferenceID generated upon receipt of the SendMessage Request of the application server 10 as its parameters. The data that forms the DeliveryInformation include a list of destination addresses included in the SendMessage Request and delivery status values each of which corresponding to each of the destination addresses.

The application server 10 checks out the delivery result for a multimedia message it has transmitted by receiving the status informing message, and it informs the Parlay X gateway 20 of whether the application server 10 has received the multimedia message or not by sending a status informing response message.

According to the above description, the application server 10 can receive a delivery result for the multimedia message it has transmitted without an inquiry process by activating a status informing function.

Herein, the delivery result of a transmitted multimedia message should be checked or does not have to be checked according to the conditions or policy for each application server. For this, the present invention makes the application server 10 activate or inactivate the status informing function optionally.

Figure 4:
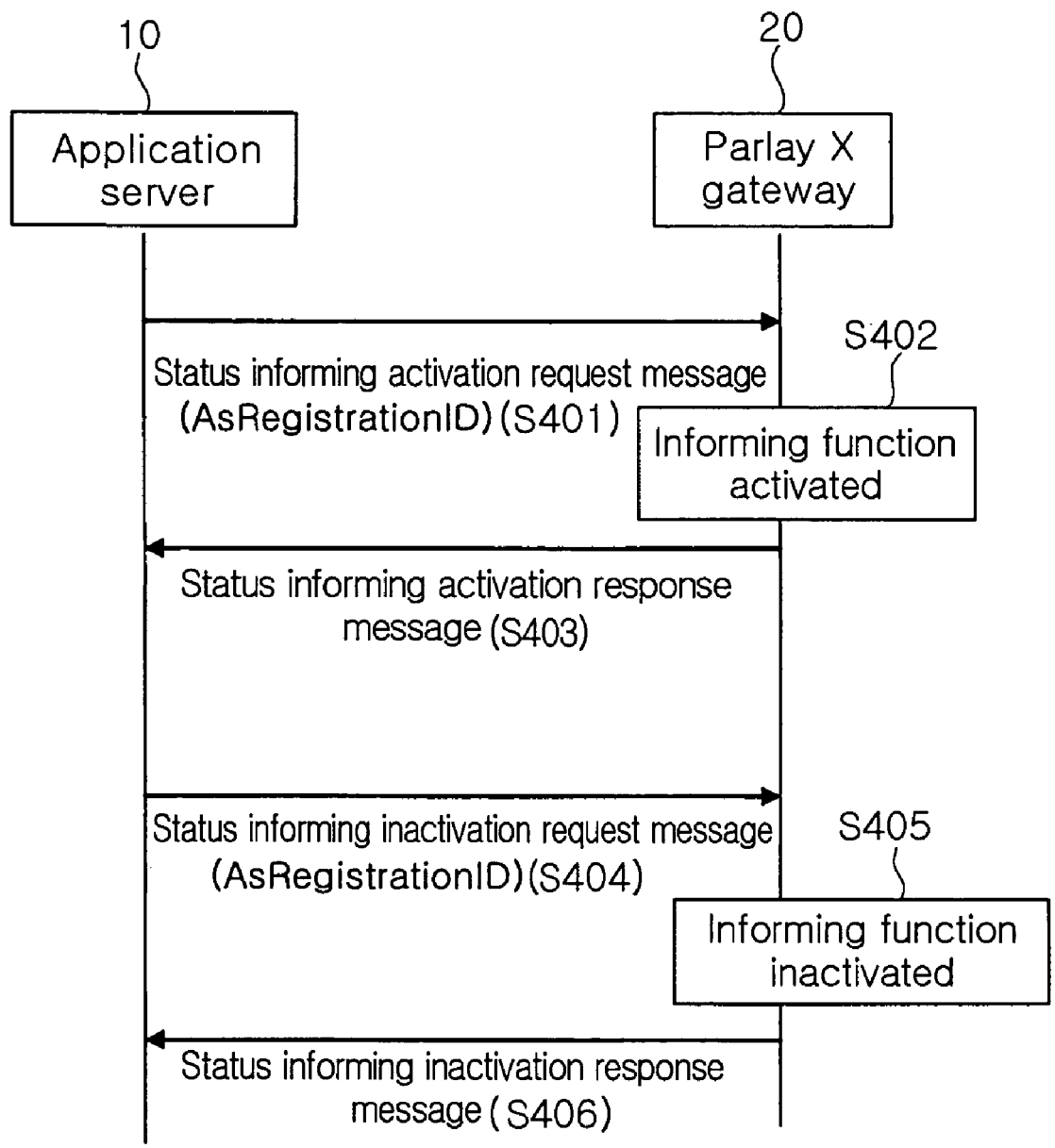
FIG. 4. shows a signal flow for activation/inactivation of a status informing function in the multimedia message service providing procedure in accordance with an embodiment of the present invention.

FIG. 4 shows, a signal flow for activation/inactivation of a status informing function in the multimedia message service providing procedure in accordance with an embodiment of the present invention.

Referring to FIG. 4, when the application server 10 needs to know the delivery status of a transmitted multimedia message, the application server 10 transmits a status informing activation request message to the Parlay X gateway 20 before it transmits the multimedia message at 10 step S401. As aforementioned, the status informing activation request message includes an application server identification, i.e., AsRegistrationID, which is given to each application server 10 that has transmitted the multimedia message. Thus, the Parlay X gateway 20 can identify the application server for which an informing function is to be activated. At step S402, the Parlay X gateway 20 activates the status informing function of the application server corresponding to the AsRegistrationID. At step S403, the Parlay X gateway 20 informs the application server 10 that the status informing function for the application server 10 is activated.

On the contrary, when the application server 10 does not have to check the delivery result of the transmitted multimedia message, the application server 10 transmits a status informing inactivation request message for inactivating the status informing function to the Parlay X gateway 20 at step S404. The status informing inactivation request message, too, includes a string-type identification value, i.e., AsRegistrationID, to identify an application server which has requested for the inactivation. At step S405, the Parlay X gateway 20 receives the status informing inactivation request message and inactivates the status informing function for the application server corresponding to the AsRegistrationID included in the status informing inactivation request message. At step S406, the Parlay X gateway 20 transmits a status informing inactivation response message to the application server 10.

Figure 5:
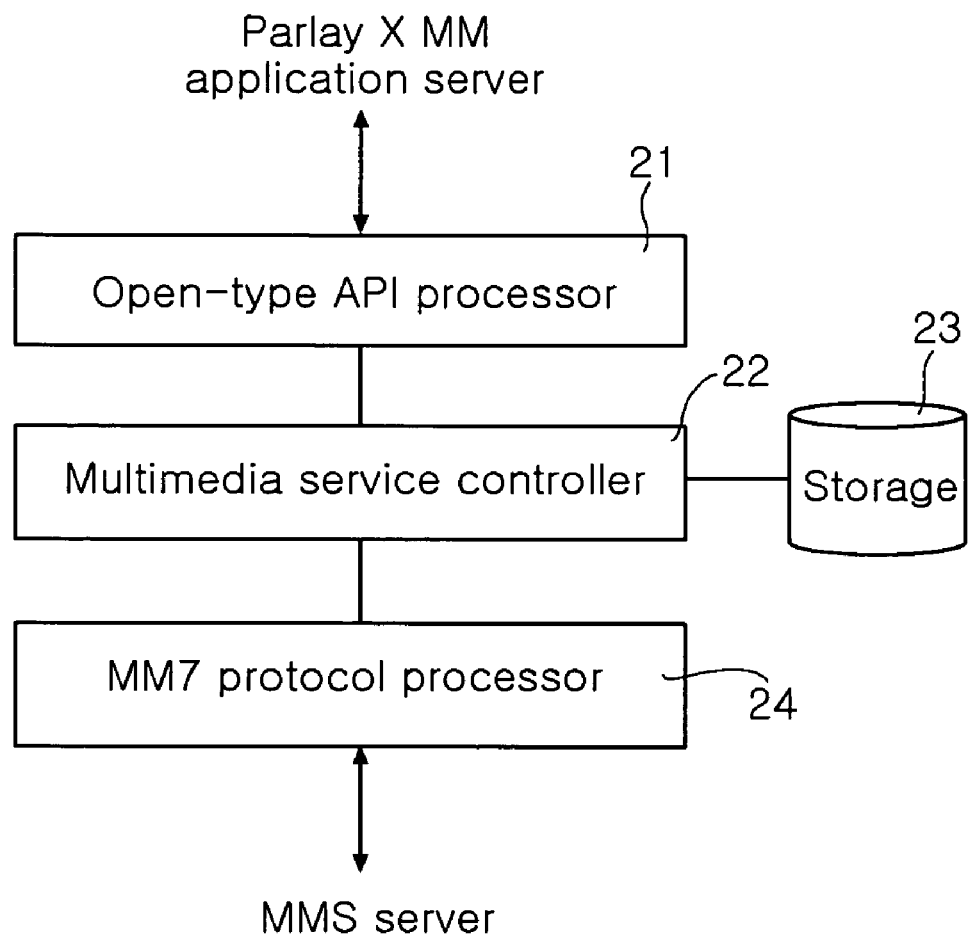
FIG. 5 is a block diagram illustrating a multimedia message service, providing apparatus in accordance with an embodiment of the present invention.

FIG. 5 is a block diagram illustrating a multimedia message service providing apparatus in accordance with an embodiment of the present invention.

Referring to FIG. 5, the multimedia message service providing apparatus of the present invention includes an open-type API processor 21, a multimedia service controller 22, a storage 23, and an MM7 protocol processor 24.

The open-type API processor 21 provides an application program interface with the application server 10. It receives a multimedia message to be transmitted and a request for activating/inactivating a delivery status informing function from the application server 10, and transmits a process result thereof to the application server 10.

The multimedia service controller 22 performs control to analyze a message received from the open-type API processor 21, activate or inactivate a delivery status informing function according to the activation/inaction request of the delivery status informing function, transmit the multimedia message, and transmit a process result from the MMS server 31 to the application sever 10 for which the delivery status informing function is activated.

The storage 23 stores activation/inactivation information of the delivery status informing function for each application server, which is processed in the multimedia service controller 22. The storage 23 stores variables requested to process multimedia messages, MM ReferenceID, and AsRegistrationID of each application server.

The MM7 protocol processor 24 exchanges resources of a communication network that actually provides the multimedia message service, that is, exchanges messages with the MMS server 31 according to the MM7 protocol determined by the MMS server 31, transmits a SendMessage Request from the application server 10 to the MMS server 31, receives a process result thereof, and transmits the process result to the multimedia service controller 22.

In the multimedia message service providing apparatus, the multimedia service controller 22 receives a request for activating/inactivating the delivery status informing function from the open-type API processor 21, extracts an AsRegistrationID of the application server from the activation/inactivation request message, activates/inactivates the delivery status informing function for each application server. The information is managed by the storage 23.

Subsequently, when a multimedia SendMessage, Request is received, the multimedia service controller 22 generates an MM ReferenceID for each requested multimedia message and stores it in the storage 23. Then, it informs the application server 10 of the generation of the MM ReferenceID through a response message. Also, the multimedia service controller 22 controls the MM7 protocol processor 24 to transmit a multimedia SendMessage Request including a multimedia message to be transmitted to the MMS server 31 and waits for a process result thereof.

When the MMS server 31 sends a process result in response, the multimedia service controller 22 checks out whether the status informing function of the application server which has requested for the multimedia message is in activation or not. If it is in activation, the multimedia service controller 22 combines the received process result with the ReferenceID of the multimedia message to form a status informing message, and transmits the status informing message to the application server 10 through the open-type API processor 21.

As described above, the application server of the present invention can acquire a status information of a multimedia message requested to be transmitted by the application server in real-time by sending a request for activating a status informing function only once without generating an inquiry message.

The technology of the present invention can reduce loads of the Parlay X gateway which is imposed due to many inquiries for status information in the application server transmitting a great deal of multimedia messages.

Also, since the present invention can activate or inactivate the status informing function optionally in the application server, it can be applied to diverse conditions or policies of application servers.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for providing a multimedia message service, comprising:

an open-type application programming interface (API) processor for receiving a request for a multimedia message, i.e., SendMessage Request, and a delivery status informing activation/inactivation request from an application server by calling an API function of the application server, and transmitting a process result to the application server;

a multimedia message (MM) 7 protocol processor for transmitting the multimedia SendMessage Request of the application server to an MM server of a communication network by exchanging messages with the MM server providing a multimedia message service based on a protocol of the MM server, and receiving a process result from the MM server;

a multimedia service controller for analyzing a message transmitted from the open-type API processor, setting up a delivery informing function for multimedia messages of the application server at activation/inactivation if the message is a delivery status informing activation/inactivation request message, transmitting the multimedia message to the MM7 protocol processor for transmission if the message is a multimedia SendMessage Request, receiving a process result for the multimedia message from the MM7 protocol processor, checking whether a corresponding delivery status informing function is activated, and transmitting the delivery status informing message to the application server through the open-type API processor when the delivery status informing function is activated; and, a storage for storing activation/inactivation information of a delivery status informing function of each application server, which is processed by the multimedia service controller, and variables and identifications requested to process the multimedia message.

2. The apparatus of claim 1, wherein the status informing message includes an MM identification value including a ReferenceID, which is generated by receiving the multimedia SendMessage Request from the application server, and a delivery information for informing a delivery status of the multimedia message corresponding to the ReferenceID including DeliveryInfomation, as parameters.

3. The apparatus of claim 2, wherein the DeliveryInfomation is composed of a list of destination addresses included in the multimedia SendMessage Request transmitted from the application server and delivery status values each of which corresponding to each of the destination addresses.

4. The apparatus of claim 3, wherein the delivery status values includes status values indicating that corresponding multimedia messages are transmitted to users successfully, and status values indicating that transmission of corresponding multimedia messages to users is failed.

5. The apparatus of claim 1, wherein the status informing activation request message includes an application server identification value including AsRegistrationID given to each application server.

6. The apparatus of claim 1, wherein the status informing inactivation request message includes an application server identification value including AsRegistrationID, given to each application server.

* * * * *